US012451299B2

(12) United States Patent
Hammer

(10) Patent No.: US 12,451,299 B2
(45) Date of Patent: Oct. 21, 2025

(54) ON-LOAD TAP CHANGER AND METHOD FOR ACTUATING AN ON-LOAD TAP CHANGER

(71) Applicant: Maschinenfabrik Reinhausen GmbH, Regensburg (DE)

(72) Inventor: Christian Hammer, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 374 days.

(21) Appl. No.: 18/003,372

(22) PCT Filed: Jun. 28, 2021

(86) PCT No.: PCT/EP2021/067691
§ 371 (c)(1),
(2) Date: Dec. 27, 2022

(87) PCT Pub. No.: WO2022/017732
PCT Pub. Date: Jan. 27, 2022

(65) Prior Publication Data
US 2023/0141822 A1 May 11, 2023

(30) Foreign Application Priority Data
Jul. 22, 2020 (DE) ......................... 102020119344.0

(51) Int. Cl.
*H01H 9/00* (2006.01)

(52) U.S. Cl.
CPC ........ *H01H 9/0016* (2013.01); *H01H 9/0027* (2013.01); *H01H 2009/0061* (2013.01)

(58) Field of Classification Search
CPC ........ H01H 15/08; H01H 19/12; H01H 21/20; H01H 2003/00; H01H 2009/00;
(Continued)

(56) References Cited

U.S. PATENT DOCUMENTS 5,774,323 A 6/1998 Innes et al.
9,513,654 B2 * 12/2016 Strof ......................... G05F 5/00
(Continued)

FOREIGN PATENT DOCUMENTS

AT 164732 B 12/1949
DE 1157296 B 11/1963
(Continued)

*Primary Examiner* — Anthony R Jimenez
(74) *Attorney, Agent, or Firm* — LEYDIG, VOIT & MAYER, LTD.

(57) ABSTRACT

An on-load tap-changer for switching, without interruption, between winding taps of a tap-changing transformer, including a diverter switch for performing a switch-over from a first to a second fixed contact, a selector for preselecting, without power, the first and second fixed contact, and a first controller, wherein the diverter switch has a plurality of semiconductor and mechanical switching elements, the selector has a first and second selector arm, which are actuatable independently of one another and can contact each of the fixed contacts, and the first controller is configured to trigger a switch command and to actuate the first and second selector arm and the plurality of mechanical switching elements by a motor drive, wherein the on-load tap changer includes a second controller to actuate the plurality of semiconductor switching elements, and wherein during the switch-over the first controller actuates the motor drive depending on the second controller.

19 Claims, 7 Drawing Sheets

(58) Field of Classification Search
CPC ... H01H 2009/0005; H01H 2009/0016; H01H 2009/0061; H01H 9/00; H01H 9/0005; H01H 9/0011; H01H 9/0016; H01H 9/0027; H01H 9/0066; H01H 9/0038; H01H 1/56; H01F 29/04
USPC ...................................................... 200/11 TC
See application file for complete search history.

(56) References Cited

U.S. PATENT DOCUMENTS

| | | | |
|---|---|---|---|
| 2006/0028235 | A1 | 2/2006 | Rapant et al. |
| 2008/0094156 | A1 | 4/2008 | Hartinger et al. |
| 2011/0102056 | A1 | 5/2011 | Brueckl et al. |

FOREIGN PATENT DOCUMENTS

| | | | | |
|---|---|---|---|---|
| DE | 3884422 | T2 | | 5/1994 |
| DE | 102004062266 | A1 | | 7/2006 |
| EP | 2319058 | A1 | | 5/2011 |
| WO | WO 2012135209 | A1 | | 10/2012 |
| WO | WO-2020030445 | A1 | * | 2/2020 |

* cited by examiner

ON-LOAD TAP CHANGER AND METHOD FOR ACTUATING AN ON-LOAD TAP CHANGER

CROSS REFERENCE TO RELATED APPLICATIONS

This application is a U.S. National Phase application under 35 U.S.C. § 371 of International Application No. PCT/EP2021/067691, filed on Jun. 28, 2021, and claims benefit to German Patent Application No. DE 10 2020 119 344.0, filed on Jul. 22, 2020. The International Application was published in German on Jan. 27, 2022 as WO 2022/017732 A1 under PCT Article 21(2).

FIELD

The invention relates to an on-load tap-changer for switching, without interruption, between winding taps of a tap-changing transformer under load.

BACKGROUND

The on-load tap-changer consists of a mechanical step selector for powerlessly pre-selecting the particular winding tap that is to be switched over to, and a diverter switch with semiconductor switching elements as switching means for actually switching, without interruption, from the previous to the pre-selected new winding tap under load.

On-load tap-changers of this kind are usually also referred to as hybrid tap changers because they also have mechanical contacts in addition to the power electronic switching means.

A hybrid tap changer of this kind is known from EP 2319058 B1. This has two load paths, which each connect a winding tap via a mechanical switch and a series circuit arranged in series thereto, formed of two oppositely switched IGBTs, to a common load take-off lead. A diode is provided parallel to each IGBT. A varistor is, in turn, provided parallel to each individual IGBT. In stationary operation, each of the load paths is bridged with a mechanical main contact. The IGBTs of both sides are controlled by a common IGBT driver. A disadvantage of this solution is that the tap changer does not have a monitoring function, such that the mechanical switching contacts are also then actuated only if the functionality of the semiconductor switching elements has been assured. If the IGBT on one side fails unnoticeably and the switch-over process is continued, this will result in a tap short circuit, which has serious, destructive consequences for the tap changer and the tap-changing transformer.

SUMMARY

In an embodiment, the present disclosure provides an on-load tap-changer for switching, without interruption, between winding taps of a tap-changing transformer, comprising a diverter switch for performing a switch-over from a first fixed contact to a second fixed contact of the on-load tap changer, a selector for preselecting, without power, the first fixed contact and the second fixed contact, and a first controller, wherein the diverter switch, for the switch-over, has a plurality of semiconductor switching elements and a plurality of mechanical switching elements, the selector has a first selector arm and a second selector arm, which are actuatable independently of one another and can contact each of the fixed contacts, and the first controller is configured to trigger a switch command and to actuate the first selector arm and the second selector arm and the plurality of mechanical switching elements by a motor drive, wherein the on-load tap changer comprises a second controller which is configured to actuate the plurality of semiconductor switching elements, and wherein during the switch-over the first controller actuates the motor drive depending on the second controller.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
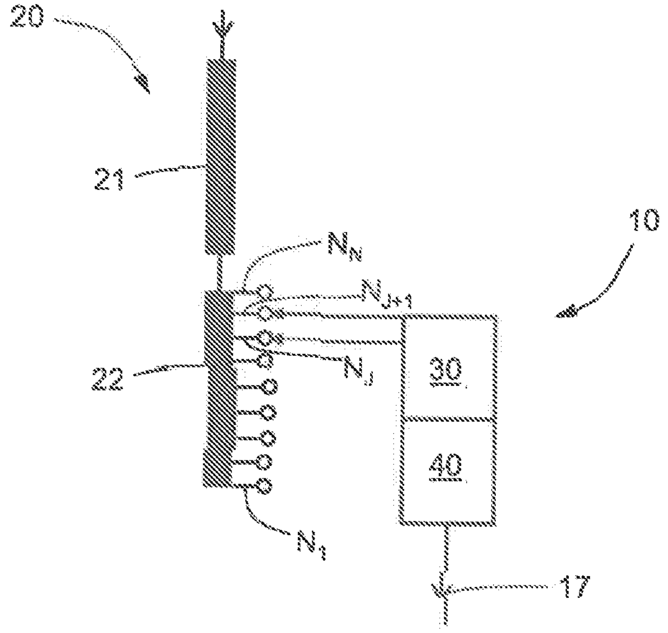
Prior Art Fig. 1
FIG. 1 shows a schematic representation of an exemplary embodiment of an on-load tap-changer.

In an embodiment, the present invention provides an improved concept for a hybrid tap changer, by means of which trouble-free and reliable operation of the hybrid on-load tap-changer is made possible.

The improved concept is based on the providing the semiconductor switching elements with their own control unit which cooperates with a further control unit which actuates the mechanical switching contacts by means of a motor drive in such a way that the mechanical switching contacts are actuated depending on the functionality of the semiconductor switching elements.

In accordance with a first aspect, an on-load tap-changer for switching, without interruption, between winding taps of a tap-changing transformer is described. The on-load tap-changer comprises a diverter switch for performing a switch-over from a first fixed contact to a second fixed contact of the on-load tap changer, a selector for powerlessly pre-selecting the fixed contacts before the actual switch-over under load, a first control unit and a second control unit. The diverter switch, for the switch-over, has a plurality of semiconductor switching elements and a plurality of mechanical switching elements. The selector has a first selector arm and a second selector arm, which are actuatable independently of one another and can contact each of the fixed contacts. Each fixed contact is electrically connected to a winding tap of the tap-changing transformer. The total number of fixed contacts is dependent on the number of winding taps.

The first control unit is configured to trigger a switch command and, depending thereon, to actuate the first selector arm, the second selector arm and the plurality of mechanical switching elements by means of a motor drive. The second control unit is configured to actuate the plurality of semiconductor switching elements. During a switch-over process of the on-load tap-changer, the first control unit actuates the motor drive depending on the second control unit.

It is thus ensured that the switch-over process in the on-load tap-changer and the actuation of the mechanical switching elements is then continued or performed only if the semiconductor switches have been correctly actuated and thus there is no risk of a tap short circuit.

The motor drive can be formed as a DC motor, as a brushless DC motor, or as a servomotor, in particular a torque motor. The motor drive is preferably formed as a stepper motor.

In accordance with at least one embodiment, the on-load tap-changer comprises a first sensor for measuring a first measurement value, which represents the voltage drop at a first semiconductor switching element and a second sensor for measuring a second measurement value which represents the voltage drop at a second semiconductor switching element.

The first sensor is configured to transmit the first measurement value to the second control unit. The second sensor is configured to transmit the second measurement value to the second control unit. The second control unit is, in turn, configured to transmit a status message to the first control unit depending on the first and/or the second measurement value.

In accordance with at least one embodiment, the second control unit is configured to transmit the status message "error" or the status message "OK". The status message "error" represents that the switching on or off process of the semiconductor switching element was not successful, for example because the semiconductor switching element is defective. The status message "OK" represents that the switching on or off process of the semiconductor switching element was performed error-free.

The second control unit is configured to transmit the status message "error" to the first control unit when

- the first sensor transmits a measurement value that exceeds a previously determined first limit value within a predefined time,
- the first sensor transmits a measurement value that does not exceed a previously determined second limit value within a predefined time,
- the second sensor transmits a measurement value that does not exceed a previously determined third limit value within a predefined time,
- the first and/or the second sensor transmits no measurement value within a predefined time.

Otherwise, the second control unit transmits the status message "OK".

The first limit value lies preferably between 2 and 10 volts; the first limit value is particularly preferably 5 volts.

The second limit value lies preferably between 40 and 80 volts; the second limit value is particularly preferably 50 volts.

The third limit value lies preferably between 40 and 80 volts; the third limit value is particularly preferably 50 volts.

The second control unit is preferably formed as a microcontroller and is configured to detect and to assess the measurement values via analogue inputs and/or by means of comparators and to output the status messages depending thereon.

The first control unit is preferably likewise formed as a microcontroller.

The first and the second sensor are formed as voltage splitters with two ohmic resistors.

In accordance with at least one embodiment, the first control unit is configured to receive the status message from the second control unit and, depending thereon and depending on the time within the switch-over process at which the status message is received, either to return the motor drive into the starting position or to continue the switch-over. The latter means, specifically, that during the further course of the switch-over the mechanical switching elements of the diverter switch and the first and/or second selector contact are actuated by means of the motor drive for example via a common drive shaft.

The first control unit is preferably configured to return the motor drive to the starting position when

- the first sensor transmits to the second control unit a measurement value that exceeds the first limit value within a predefined time,
- the first sensor transmits a measurement value to the second control unit that does not exceed the second limit value within a predefined time,
- when the first sensor does not transmit a measurement value to the second control unit within a predefined time.

The second control unit is preferably also configured to actuate the motor drive and continue the switch-over when

- the second sensor transmits a measurement value to the second control unit that does not exceed the third limit value within a predefined time,
- when the second sensor does not transmit a measurement value to the second control unit within a predefined time.

In accordance with at least one embodiment, the status message can be transmitted from the second control unit to the first control unit via a fiber-optic cable or wirelessly, for example via Bluetooth or radio. The fiber-optic cable can be molded in plastic, for example into the drive shaft, or can be formed separately, without sheathing.

In accordance with at least one further embodiment, the on-load tap-changer comprises a third sensor for measuring at least one third measurement value which represents the temporal course of the current at the semiconductor switching elements. The third sensor is formed as a current sensor, in particular as an alternating current sensor.

The third sensor is configured to transmit the third measurement value to the second control unit. The second control unit is in turn configured to switch off the semiconductor switching elements depending on the third measurement value. The expression "depending on the third measurement value" means here, specifically, depending on the temporal course of the current that flows via the semiconductor switching elements. The switch-off is performed preferably at the current zero crossing.

In accordance with at least one preferred embodiment, the diverter switch has a first main path, which connects the first selector arm via a first mechanical switching element to a load take-off lead, a second main path, which connects the second selector arm via a second mechanical switching element to a load take-off lead, and also a first auxiliary path with a first semiconductor switching element, which is formed parallel to the first main path, and a second auxiliary path with a second semiconductor switching element, which is formed parallel to the second main path.

The mechanical switching elements are preferably formed as main contacts.

In accordance with at least one embodiment, a voltage-dependent resistor is arranged parallel to the first and/or the second auxiliary path or parallel to the first and/or second semiconductor switching element. The voltage-dependent resistor is preferably formed as a varistor.

In accordance with at least one further embodiment, the on-load tap-changer is formed in such a way that, when performing the switch-over, during the actuation of the first selector arm and/or of the second selector arm, none of the semiconductor switching elements is activated.

In accordance with at least one further embodiment, the on-load tap-changer is formed in such a way that, when performing the switch-over, during the actuation of the semiconductor switching elements, the first selector arm and the second selector arm contact different fixed contacts.

In accordance with at least one embodiment, the second control unit has an energy accumulator which is charged when the first selector arm and the second selector arm contact different, adjacent fixed contacts. The charging is performed via the step voltage applied between the first selector arm and the second selector arm in the described position. The energy accumulator delivers the necessary energy for the actuation of the semiconductor switching elements and the transmission of the status messages from the second control unit to the first control unit. The second control unit and thus also the semiconductor switching elements are thus operated independently by means of the applied step voltage. An additional energy supply from outside, for example through the first control unit, is therefore unnecessary.

The energy store is preferably formed from ceramic capacitors and therefore has a higher temperature resistance. Since it is recharged continuously during the actuation of the second control unit and the semiconductor switching elements, it merely has to absorb any occurring load peaks. To charge the energy accumulator, a switching network part with an extremely wide input voltage range is preferably used, which still functions even at low step voltages.

The second control unit is preferably configured to monitor the charging of the energy accumulator via voltage measurement at one of the analogue inputs and to transmit a status message "OK" to the first control unit when the energy accumulator is fully charged. The first control unit is preferably configured to return the motor drive to the starting position when the status message is not received within a predefined time.

In accordance with at least one embodiment, the semiconductor switching elements are formed as IGBT switching elements and/or as thyristors and/or as JFET switching elements and/or as MOSFET switching elements and/or as Integrated Gate Commutated Thyristors (IGCT). The semiconductor switching elements are preferably formed in each case as an IGBT with diodes in a bridge circuit, particularly preferably with diodes in a Graetz circuit.

In accordance with at least one embodiment, the first control unit can be arranged above the motor drive in relation to a longitudinal axis L of the on-load tap-changer and the second control unit can be arranged below the diverter switch in relation to the longitudinal axis L of the on-load tap-changer.

The first control unit is preferably arranged outside a housing of the tap-changing transformer. The motor drive and/or the semiconductor switching elements and/or the second control unit can be arranged outside or inside the transformer housing.

In accordance with at least one further embodiment, the on-load tap-changer comprises, for a second and third phase to be controlled of the tap-changing transformer, additionally a second and third diverter switch, a second and third selector, and a second and third second control unit. The plurality of semiconductor switching elements of each diverter switch are each assigned to a second control unit. The first control unit is configured to trigger a switch command and to actuate the first selector arm and the second selector arm of each selector and the plurality of mechanical switching elements of each diverter switch by means of one motor drive. Each second control unit is configured to actuate the plurality of semiconductor switching elements of the diverter switch assigned to it. In this case, during the switch-over the first control unit actuates the motor drive depending on each second control unit.

In accordance with at least one further embodiment, the on-load tap-changer additionally comprises, for a second and third phase to be controlled of the tap-changing transformer, a second and third motor drive, a second and third diverter switch, a second and third selector, a second and third selector, and a second control unit. A selector, that is to say a first selector arm and a second selector arm, and a plurality of mechanical switching elements of the diverter switch for actuation is assigned to each motor drive. The assignment is made mechanically, for example via a drive shaft and a transmission. The plurality of semiconductor switching elements of each diverter switch are each assigned to a second control unit. The first control unit is configured to trigger a switch command and to actuate each motor drive, and thus also the assigned first selector arm and second selector arm and the assigned plurality of mechanical switching elements. Each second control unit is configured to actuate the plurality of semiconductor switching elements assigned to it. In this case, the first control unit actuates each motor drive during the switch-over depending on each second control unit.

In accordance with a second aspect of the improved concept, a method for actuating an on-load tap-changer which is formed in accordance with the first aspect of the improved concept is described.

With regard to the method, reference is made similarly to the above explanations, preferred features and/or advantages, as has already been explained in relation to the first aspect of the improved concept of one of the associated, advantageous embodiments.

The method comprises the steps of:

- generating a switch command to switch over from a first fixed contact to a second fixed contact of the on-load tap changer by means of a first control unit,
- actuating one or more mechanical switching elements, a first selector arm, and a second selector arm by means of a motor drive and depending on the first control unit,
- actuating one or more semiconductor switching elements by means of a second control unit,
- wherein the motor drive is actuated by means of the first control unit during the switch-over depending on the second control unit.

In accordance with at least one embodiment, none of the semi-conductor switching elements is activated during the actuation of the first selector arm and/or of the second selector arm.

In accordance with at least one embodiment, the method comprises the further steps of:

- measuring at least one first measurement value, which represents the voltage drop at the first semiconductor switching element, and transmitting the first measurement value to the second control unit by means of a first sensor,
- measuring at least one second measurement value, which represents the voltage drop at the second semiconductor switching element, and transmitting the second measurement value to the second control unit by means of a second sensor, transmitting a status message to the first control unit depending on the first measurement value and/or the second measurement value by means of the second control unit, actuating the motor drive by means of the first control unit depending on the status message.

In accordance with at least one further embodiment, the actuation of the mechanical switching elements, of the selector arms, and of the semiconductor switching elements after the generation of the switching command comprises the following steps of opening the second mechanical switching element and switching over the second selector arm to the second fixed contact by means of the motor drive, charging the energy accumulator of the second control unit, switching on the second semiconductor switching element by means of the second control unit, opening a first mechanical switching element by means of the motor drive, switching off the first semiconductor switching element by means of the second control unit, switching on the second semiconductor switching element by means of the second control unit, closing the second mechanical switching element by means of the motor drive, switching off the second semiconductor switching element by means of the second control unit, switching over the first selector arm from the first fixed contact to the second fixed contact, closing the first mechanical switching element.

In accordance with at least one further embodiment, the first semiconductor switching element is disconnected depending on the temporal course of the current. The switch-off is performed preferably at the current zero crossing.

In accordance with at least one further embodiment, once the second semiconductor element has been switched on, the switch-over is continued in any case independently of the status message of the second control unit.

Further embodiments and implementations of the method are directly evident from the various embodiments of the tap-changer. In particular, individual components or a plurality of the components and/or assemblies described in relation to the tap-changer can be implemented to carry out the method accordingly.

In the following, the invention is explained in detail on the basis of exemplary embodiments with reference to the drawings. Components which are identical or functionally identical or which have an identical effect may be provided with identical reference signs. Identical components or components with an identical function are in some cases explained only in relation to the figure in which they first appear. The explanation is not necessarily repeated in the subsequent figures.

The figures merely illustrate exemplary embodiments of the invention without, however, limiting the invention to the illustrated exemplary embodiments.

FIG. 1 shows an exemplary embodiment of an on-load tap-changer 10 for a tap-changing transformer 20 in schematic representation. The tap-changing transformer 20 has a main winding 21 and a regulation winding 22 with different winding taps $N_1, \ldots, N_J, \ldots, N_N$, which are connected and disconnected by the on-load tap-changer 10. For this purpose, the on-load tap-changer 10 comprises a selector 11, which can contact the winding taps $N_1, \ldots, N_J, \ldots, N_N$ of the regulation winding 22 by means of two movable selector contacts, and a diverter switch 12, which performs the actual diverter switch operation from the currently connected regulation winding to the new, pre-selected regulation winding. The load current flows from the currently connected winding tap $N_J$ or $N_{J+1}$ via the relevant selector contact and the diverter switch 40 to a load take-off lead 17.

Figure 2:
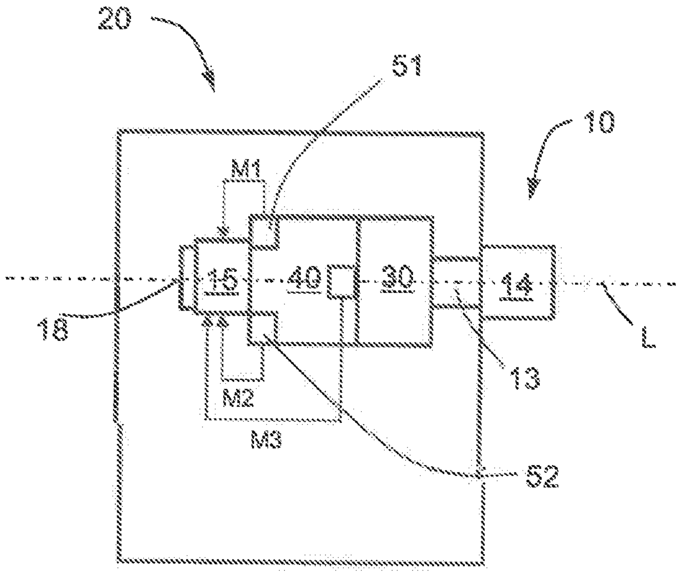
FIG. 2 shows an exemplary schematic arrangement of an exemplary embodiment of an on-load tap-changer according to the improved concept in a tap-changing transformer.

FIG. 2 shows an exemplary, schematic arrangement of an exemplary embodiment of an on-load tap-changer according to the improved concept in a tap-changing transformer.

The on-load tap-changer 10 has a selector 11 for powerlessly pre-selecting the fixed contacts, a diverter switch 12 for carrying out the actual load switch-over by means of a plurality of mechanical switching elements and semiconductor switching elements, a motor drive 13, a first control unit 14, and a second control unit 15. In addition, the on-load tap-changer 10 has three sensors, which are arranged in the diverter switch 40. The two sensors 51 and 52 are voltage sensors and are designed to transmit to the second control unit 15 the measurement values M1 and M2 that represent the voltage drop at the semiconductor switching elements. The third sensor 53 is a current sensor and is designed to transmit to the second control unit 15 the third measurement value M3, which represents the temporal course of the current, to the semiconductor switching elements. Furthermore, the second control unit 15 comprises an energy accumulator 18 which is arranged directly on the second control unit 15. In this example the first control unit 14 is arranged above the motor drive 13 in relation to a longitudinal axis L of the on-load tap-changer 10 and outside the tap-changing transformer 20. The remainder of the on-load tap-changer 10 is arranged within the tap-changing transformer 20, wherein the second control unit 15 and the energy accumulator 18 are arranged below the diverter switch 40 in relation to the longitudinal axis L.

Figure 3:
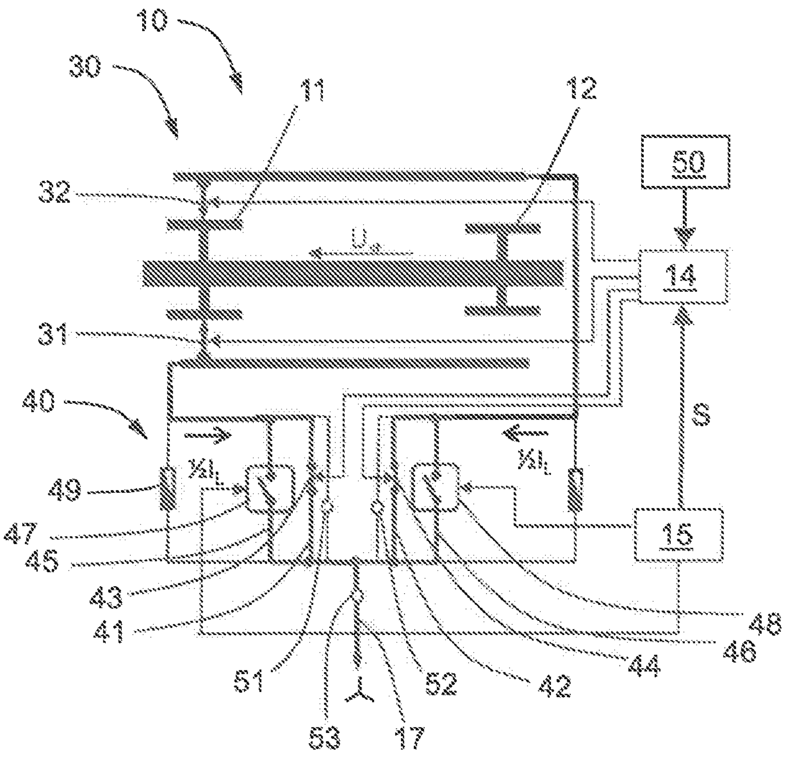
FIG. 3 shows a schematic representation of an exemplary embodiment of an on-load tap-changer according to the improved concept.

FIG. 3 shows a schematic representation of an exemplary embodiment of an on-load tap-changer according to the improved concept.

According to the improved concept, the on-load tap-changer 10 comprises at least one first fixed contact 11 and a second fixed contact 12, which can each be connected to a winding tap of the regulation winding 22 of the tap-changing transformer 20. The total number of fixed contacts is dependent on the number of winding taps. Each fixed contact 11, 12 has a first contact face and a second contact face. Furthermore, the on-load tap-changer 10 comprises a selector having a first selector arm 31 and a second selector arm 32, which are actuatable independently of one another and can contact each of the fixed contacts. Here, the first movable contact 31 can contact the first contact faces of the fixed contacts 11, 12, but not the second contact faces. Correspondingly, the second movable contact 32 can contact the second contact faces of the fixed contacts 11, 12, but not the first contact faces. FIG. 3 shows a schematic diagram of an exemplary embodiment of the on-load tap-changer; in particular, the arrangement of the contact faces opposite one another is not absolutely necessary.

The on-load tap-changer 10 furthermore comprises a diverter switch 40 for carrying out the actual diverter switch operation between the pre-selected fixed contacts 11, 12. The diverter switch 40 has a total of four current paths. A first main path 41 connects the first selector arm 31 via a first mechanical switching element 43 to the load take-off lead 17. A second main path 42, which connects the second selector arm 32 via a second mechanical switching element 44 to the load take-off lead 17. A first auxiliary path 45 with a first semiconductor switching element 47 is formed parallel to the first main path 41, and a second auxiliary path 46 with a second semiconductor switching element 48 is arranged parallel to the second main path 42. Furthermore, a varistor 49 is provided parallel to each of the first and the second auxiliary path 45, 46.

The first sensor 51 formed as a voltage sensor is arranged parallel to the first mechanical switching element 43. Accordingly, the second sensor 52 likewise formed as a voltage sensor is arranged parallel to the second mechanical switching element 44. The third sensor 53 formed as a current sensor is arranged in the common take-off lead.

Two control units are provided for actuation of the on-load tap-changer 10. A first control unit 14 is configured to trigger a switch command and to actuate the first selector arm 31, the second selector arm 32 and the first and second mechanical switching element 43, 44 by means of the motor drive. A switching command is triggered in order to keep the primary voltage or the secondary voltage of the tap-changing transformer 20 in a predetermined voltage band. For this purpose, for example, a voltage regulator 50 is provided, which monitors whether the primary voltage is being kept within the predetermined voltage band. Furthermore, a second control unit 15 of the on-load tap-changer 10 is configured to actuate the first and the second semiconductor switching element 47, 48. For this purpose, the second control unit 15 comprises an energy accumulator, which is charged via the voltage difference that occurs between the first selector arm 31 and the second selector arm 32 when these contact different, adjacent fixed contacts 11, 12. The first control unit 14 receives from the second control unit 15 status messages S, depending on which it actuates the motor drive.

In the illustration in FIG. 3, the on-load tap-changer 10 is in a stationary position. The first and the second selector arm 31, 32 are both on the fixed contact 11, such that the second control unit 15 is currentless and thus deactivates the semiconductor switching elements 45 and 46. The load current IL flows in equal parts from the contacted fixed contact 11 via the two selector arms 31, 32, the first and the second main path 41, 42, and the closed mechanical switching elements 43 and 44 to the load take-off lead 17.

FIGS. 4*a* to 4*m* show an exemplary switching sequence of the on-load tap-changer from FIG. 3.

Figure 4A:
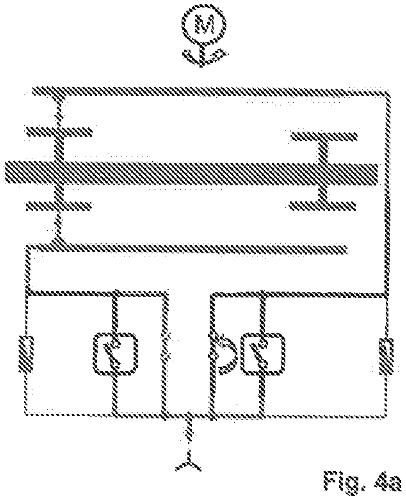
FIGS. 4*a*-4*m* show an exemplary switching sequence of the on-load tap-changer from FIG. 3.

Once the first control unit 14 has generated a switching command, the motor drive is actuated and thus firstly opens the second mechanical contact 44 (FIG. 4*a*).

Figure 4B:
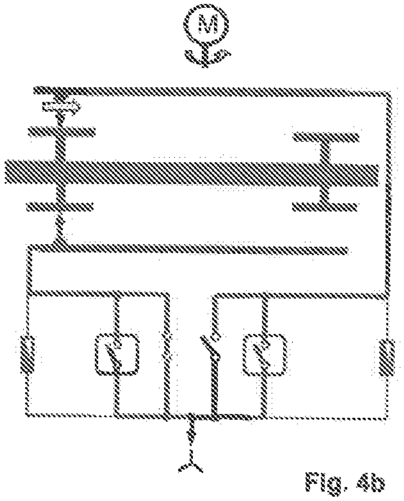

The second selector arm 32 is then moved from the first fixed contact 11 to the second fixed contact 12 (FIG. 4*b*).

Figure 4C:
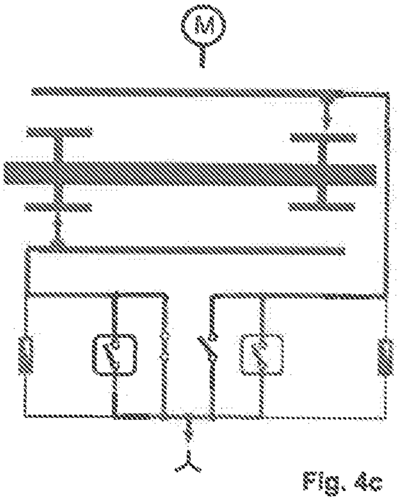

In FIG. 4*c* the two selector arms 31, 32 are now on different fixed contacts 11, 12 and the motor drive 13 stops. The energy accumulator is now charged by the step voltage USP and thus supplies the second control unit 15 with energy for actuation of the semiconductor switching elements 45 and 46. Following the charging of the energy accumulator, the second control unit 15 sends a status message S "OK" to the first control unit 14. If this signal is not received within a predefined time, for example 50 ms, the first control unit 14 prompts the motor drive 13 to return to the starting position.

Figure 4D:
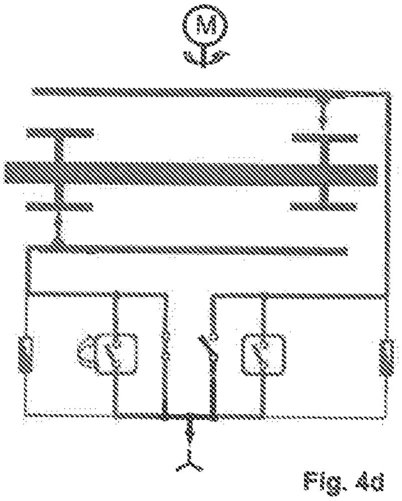

If the switch-over process is performed correctly, in the next step, shown in FIG. 4*d*, the first semiconductor switching element 47 is switched on by the second control unit 15. At this moment, no significant current flows via this first semiconductor switching element, since the through-resistance of the first semiconductor switching element 47 is much greater than that of the first mechanical switching element 43.

Figure 4E:
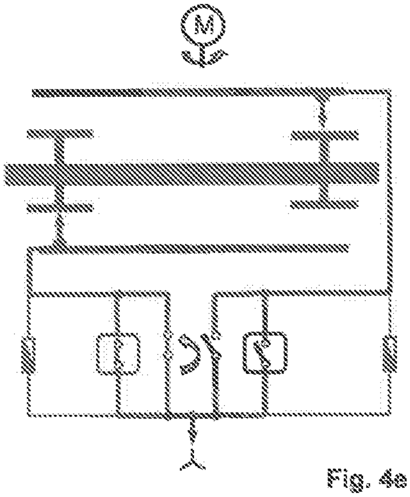
Figure 4F:
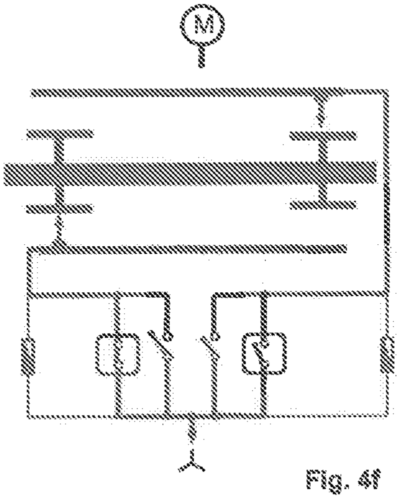

At the same time, the first control unit 14 actuates the motor drive 13 again and the first mechanical switching contact 43 is then opened (FIGS. 4*e* and 4*f*). The motor drive 13 is then stopped again.

The steps shown in FIGS. 4*d* to 4*f* are monitored by the second control unit 15 by means of the first voltage sensor 51. The first voltage sensor 51 measures the voltage dropping at the first semiconductor switching element 47 and transmits this first measurement value M1 to the second control unit 15. If the load current flows across the first semiconductor switching element 47, the voltage is only a few volts, for example at most 5 volts. In this case, the second control unit 16 transmits the status message S "OK" to the first control unit 14 and the switching process is continued correctly. If, however, the semiconductor switching element 47 is defective, an electric arc is created when the first mechanical switching contact 43 is opened. The voltage would then be many times greater, and for example may be 20 volts. In this case the second control unit 16 sends the status message S "error" to the first control unit 14, whereupon the first control unit 14 prompts the motor drive 13 to return to the starting position.

Figure 4G:
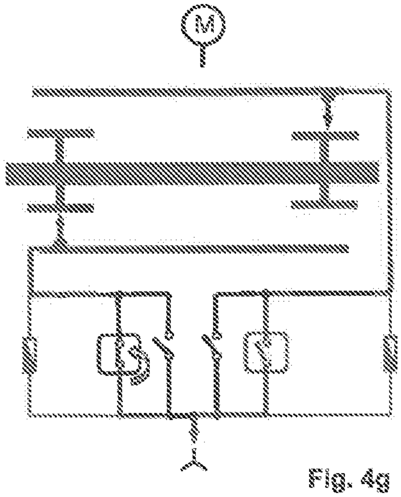

If the switching process is continued correctly, in a next step (FIG. 4*g*) the temporal course of the current at the next semiconductor switching element 47 is monitored by the second control unit 15 by means of the current sensor 53. The first semiconductor switching element 47 is switched off at the current zero crossing (FIG. 4*g*).

Figure 4H:
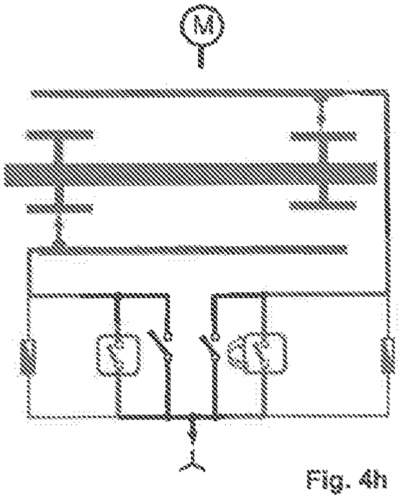

The switch-off process of the first semiconductor switching element 47 is monitored by the second control unit 15 by means of the first voltage sensor 51. If the first semiconductor switching element 47 has switched off correctly, the load current then flows on via the varistors 49 arranged parallel to the semiconductor switching elements 47 and 48, as shown in FIG. 4*h*. The voltage drop at the first semiconductor switching element 47 thus rises sharply, more specifically to the forward voltage of the varistors, which is several hundreds of volts. The second control unit 15 monitors whether the voltage exceeds a defined threshold of, for example, 50 V within a defined time. If this is the case, the second control unit 15 transmits the status message S "OK" to the first control unit 14 and the switching process is continued correctly. Otherwise, if the voltage remains below the defined limit value, this is an indication of the failure of the switching off of first semiconductor switching element 47 and the second control unit 16 sends the status message S "error" to the first control unit 14, whereupon the first control unit 14 prompts the motor drive 13 to return to the starting position.

If the switch-off process of the first semiconductor element 47 was successful, the second semiconductor switching element 48 is switched on immediately by the second control unit 15.

Figure 4I:
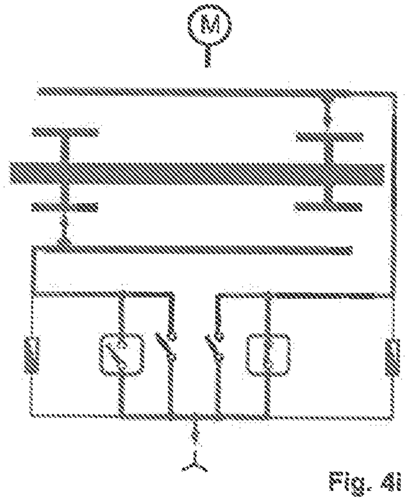
Figure 4J:
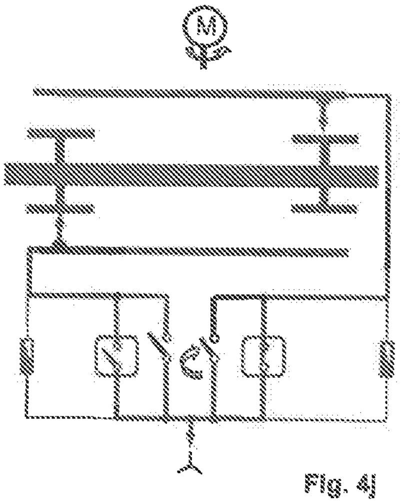

This step is also monitored again by the second control unit 15 in that the voltage drop at the second semiconductor switching element 48 is measured by means of the second voltage sensor 52. If the voltage drops to the forward voltage of the second semiconductor switching element 48 in the order of a few volts, the switch-on was successful and the load current flows via the second auxiliary path 46, as shown in FIG. 4*i*. The second control unit 15 monitors whether the voltage that drops at the second semiconductor switching element 48 drops below a defined threshold of, for example, 50 V within a defined time. If this is the case, the second control unit 15 transmits the status message S "OK" to the first control unit 14 and the switching process is continued correctly. If this is not the case, the second control unit 15 identifies an error and sends the status message S "error" to the first control unit 14. From this moment in time, however, the switch-over process is no longer aborted, since the process of the diverter switch operation is already half complete and a return to the starting position would require a greater control effort.

The first control unit 14 thus prompts the motor drive 13 to continue in order to complete the switch-over. In this case, the second mechanical switching element 44 is firstly closed (FIG. 4*i*).

Figure 4K:
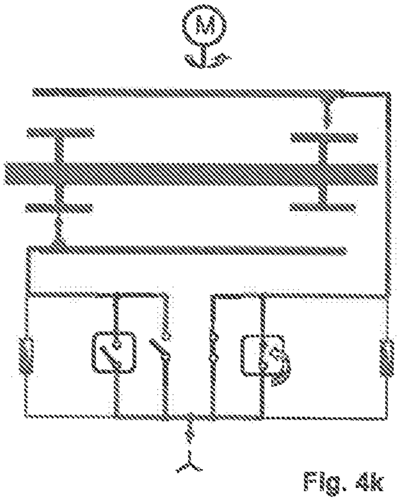

The second control unit 15 then switches the second semiconductor switching element 48 off (FIG. 4*k*). This can be performed, for example, on the basis of the detection of a reduction of the voltage drop at the second semiconductor switching element 48 as a result of the closure of the second mechanical switching element 44. The time of switch-off, however, is not critical, since the switch-off occurs at the latest once the second control unit 15 is no longer supplied with voltage and the voltage of the energy accumulator has decreased.

Figure 4L:
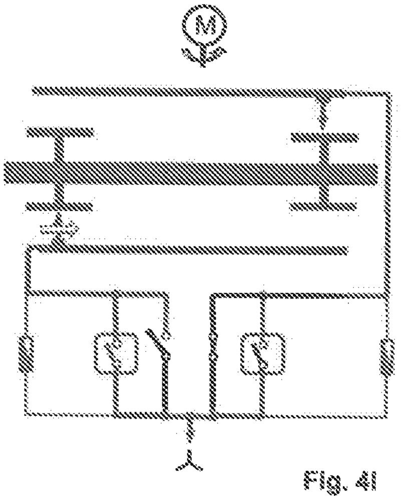

In the next step, the first selector arm 31 is moved from the first fixed contact 11 to the second fixed contact 12 as a result of the further actuation of the motor drive 13 (FIG. 4*l*).

Figure 4M:
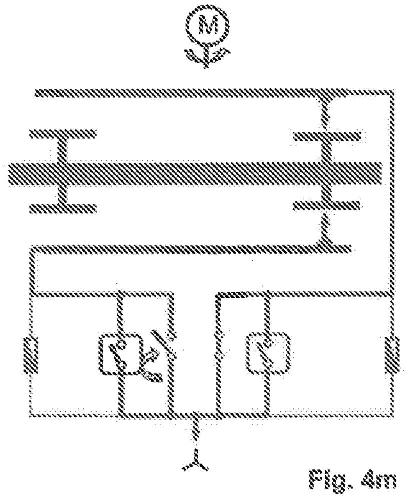

The voltage supply for the second control unit 14 is thus cancelled. Lastly, during the further course of the movement of the motor drive 13, the first mechanical switching element 43 is also closed again (FIG. 4*m*). The switch-over process is thus ended. The on-load tap-changer 10 is then again in a stationary position, in which both selector arms 31, 32 are on the fixed contact 12.

The switch-over process in the reverse direction is performed in a similar manner.

Figure 5:
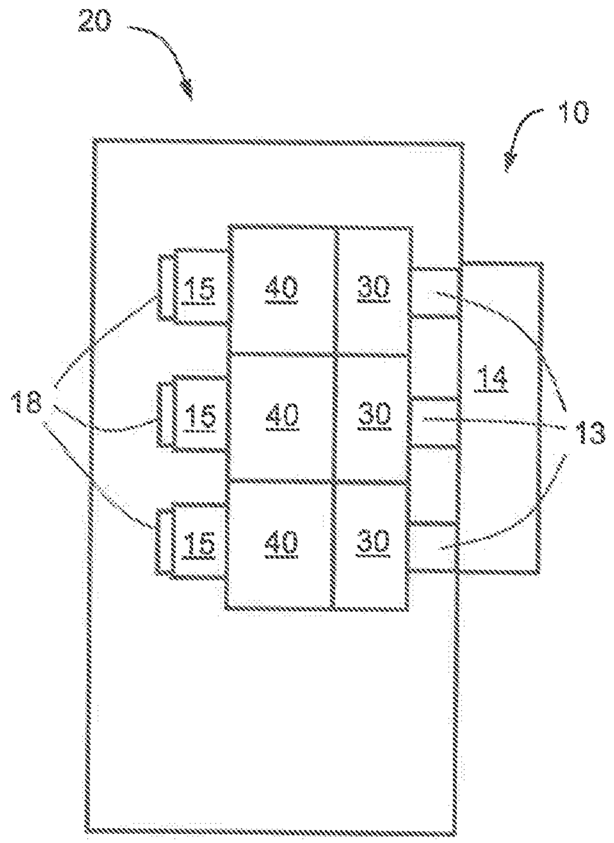
FIG. 5 shows an exemplary schematic arrangement of a further exemplary embodiment of an on-load tap-changer according to the improved concept in a tap-changing transformer.

FIG. 5 shows an exemplary schematic arrangement of a further exemplary embodiment of an on-load tap-changer according to the improved concept in a tap-changing transformer.

In this embodiment, the on-load tap-changer 10 additionally comprises, for a second and third phase to be controlled of the tap-changing transformer 20, a second and third motor drive 13, a second and third diverter switch 40, a second and third selector 30, and a second and third second control unit 15 each with an energy accumulator 18. A selector 40, that is to say a first selector arm and a second selector arm, and a plurality of mechanical switching elements of the diverter switch 40 for actuation is assigned to each motor drive 13. The plurality of semiconductor switching elements of each diverter switch 40 are each assigned to a second control unit 15. For all three phases a central, first control unit 14 is provided, which is designed to trigger a switching command and to actuate each motor drive 13 depending on the particular second control unit 15 assigned to the corresponding phase.

It is assumed that the present disclosure and many of the attendant advantages thereof can be understood from the above description. Furthermore, it is clear that various changes can be made to the shape, construction and arrangement of the components without departing from the disclosed subject matter or without sacrificing all material advantages. The embodiment described is merely explanatory and such changes are intended to be covered by the following claims. Furthermore, it is understood that the invention is defined by the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

10 on-load tap-changer
11 first fixed contact
12 second fixed contact
13 motor drive
14 first control unit
15 second control unit
16 first fixed contact
17 load take-off lead
18 energy accumulator
20 tap-changing transformer
21 main winding
22 regulation winding
30 selector
31 first selector arm
32 second selector arm
40 diverter switch
41 first main path
42 second main path
43 first mechanical switching element
44 second mechanical switching element
45 first auxiliary path
46 second auxiliary path
47 first semiconductor switching element
48 second semiconductor switching element
49 voltage-dependent resistor
50 voltage regulator
51 first sensor
52 second sensor
53 third sensor
($N_1, \ldots, N_J, \ldots, N_N$) winding taps
S status messages
M1 first measurement value
M2 second measurement value
M3 third measurement value
L longitudinal axis

The invention claimed is:

1. An on-load tap-changer for switching, without interruption, between winding taps of a tap-changing transformer, comprising:

a diverter switch for performing a switch-over from a first fixed contact to a second fixed contact of the on-load tap changer;

a selector for preselecting, without power, the first fixed contact and the second fixed contact; and a first controller, wherein:

the diverter switch, for the switch-over, comprises a plurality of semiconductor switching elements and a plurality of mechanical switching elements, the selector comprises a first selector arm and a second selector arm, which are actuatable independently of one another and can contact each of the fixed contacts, and the first controller is configured to trigger a switch command and to actuate the first selector arm and the second selector arm and the plurality of mechanical switching elements by a motor drive, wherein the on-load tap changer comprises a second controller which is configured to actuate the plurality of semiconductor switching elements, and wherein the first controller is further configured such that, during the switch-over, the first controller actuates the motor drive depending on the second controller.

2. The on-load tap-changer as claimed in claim 1, wherein the first controller is a microcontroller and is configured to receive a status message from the second controller, which is a second microcontroller, and wherein the first controller is configured to actuate the motor drive based on a content of the status message.

3. The on-load tap-changer as claimed in claim 1, wherein the second controller has an energy accumulator that is configured to be charged from a step voltage between the first selector arm and the second selector arm, the energy accumulator configured to supply energy to the second controller, and wherein the first controller is configured to be powered by a separate power supply.

4. The on-load tap changer as claimed in claim 1, further comprising a third sensor configured to measure at least one third measurement value, which represents a temporal course of a current at the semiconductor switching elements, wherein:

the third sensor is configured to transmit the third measurement value to the second controller, and the second controller is also configured to disconnect the semiconductor switching elements depending on the second measurement value.

5. The on-load tap-changer as claimed in claim 1, wherein the second controller comprises an energy accumulator which is configured to be charged when the first selector arm and the second selector arm contact different fixed contacts.

6. The on-load tap-changer as claimed in claim 1, wherein the semiconductor switching elements comprise Insulated Gate Bipolar Transistor (IGBT) switching elements and/or thyristors.

7. The on-load tap-changer as claimed in claim 1, wherein the first controller is arranged above the motor drive in relation to a longitudinal axis of the on-load tap-changer, the second controller is arranged below the diverter switch in relation to the longitudinal axis of the on-load tap-changer.

8. The on-load tap-changer as claimed in claim 1, comprising, for a second phase and a third phase to be controlled of the tap-changing transformer:

a second diverter switch comprising another plurality of semiconductor switching elements;

a third diverter switch comprising another plurality of semiconductor switching elements;

a second selector comprising another first selector arm and another second selector arm;

and a third selector comprising another first selector arm and another second selector arm; and another second controller and a further second controller, wherein:

the plurality of semiconductor switching elements of the first diverter switch, the second diverter switch, and the third diverter switch are respectively assigned to the second controller, the another second controller, and the further second controller, the first controller is configured to trigger a switch command and to actuate the first selector arm and the second selector arm of each of the first, second, and third selector and the plurality of mechanical switching elements of each of the first, second, and third diverter switch by at least one motor drive, and each of the second controller, the another second controller, and the further second controller is configured to actuate the plurality of semiconductor switching elements respectively assigned thereto, wherein during the switch-over, the first controller actuates the at least one motor drive depending on each of the second controller, the another second controller, and the further second controller.

9. The on-load tap changer as claimed in claim 1, further comprising a first sensor configured to measure a first measurement value, which represents a voltage drop at a first semiconductor switching element, a second sensor configured to measure a second measurement value, which represents a voltage drop at a second semiconductor switching element, wherein:

the first sensor is configured to transmit the first measurement value to the second controller and the second sensor is configured to transmit the second measurement value to the second controller, and the second controller is configured to transmit a status message to the first controller depending on the first measurement value and/or the second measurement value.

10. The on-load tap-changer as claimed in claim 9, wherein the first controller is configured to receive the status message from the second controller and, depending thereon, either to return the motor drive to the starting position or to continue the switch-over.

11. The on-load tap-changer as claimed in claim 10, wherein the status message is configured to be transmitted via a fiber-optic cable or wirelessly.

12. The on-load tap-changer as claimed in claim 1, wherein the diverter switch further comprises:

a first main path, which connects the first selector arm via a first mechanical switching element to a load take-off lead;

a second main path, which connects the second selector arm via a second mechanical switching element to a load take-off lead;

a first auxiliary path with a first semiconductor switching element, which is formed parallel to the first main path; and a second auxiliary path with a second semiconductor switching element, which is formed parallel to the second main path.

13. The on-load tap-changer as claimed in claim 12, further comprising a voltage-dependent resistor arranged parallel to the first auxiliary path and/or the second auxiliary path.

14. A method for actuating the on-load tap-changer as claimed in claim 1, the method comprising:

generating a switch command to switch over from a first fixed contact to a second fixed contact of the on-load tap changer by a first controller;

actuating one or more mechanical switching elements, a first selector arm, and a second selector arm by a motor drive and depending on the first controller; and actuating one or more semiconductor switching elements by a second controller, wherein the motor drive is actuated by the first controller during the switch-over depending on the second controller.

15. The method as claimed in claim 14, wherein during the actuation of the first selector arm and/or the second selector arm, none of the semiconductor switching elements are activated.

16. The method as claimed in claim 14, comprising the further steps of:

measuring at least one first measurement value which represents a voltage drop at a first semiconductor switching element, and transmitting the first measurement value to the second controller by a first sensor;

measuring at least one second measurement value which represents a voltage drop at a second semiconductor switching element, and transmitting the second measurement value to the second controller by a second sensor;

transmitting a status message to the first controller depending on the first measurement value and/or the second measurement value by the second controller; and actuating the motor drive by the first controller depending on the status message.

17. The method as claimed in claim 14, wherein the actuation of the mechanical switching elements of the selector arms and of the semiconductor switching elements after the generation of the switch command comprises the following steps:

opening a second mechanical switching element and switching over the second selector arm to the second fixed contact by the motor drive;

charging an energy accumulator of the second controller;

switching on a first semiconductor switching element by the second controller;

opening a first mechanical switching element by the motor drive, switching off the first semiconductor switching element by the second controller;

switching on the second semiconductor switching element by the second controller;

closing the second mechanical switching element by the motor drive;

switching off the second semiconductor switching element by the second controller;

switching over the first selector arm from the first fixed contact to the second fixed contact; and closing the first mechanical switching element.

18. The method as claimed in claim 17, wherein the first semiconductor switching element is disconnected depending on a temporal course of a current.

19. The method as claimed in claim 17, wherein, once the second semiconductor element has been switched on, the switch-over is continued in any case independently of the status message of the second controller.

* * * * *